T. PRINCE.
Flower-Pot Support.
No. 52,200. Patented Jan. 23, 1866.
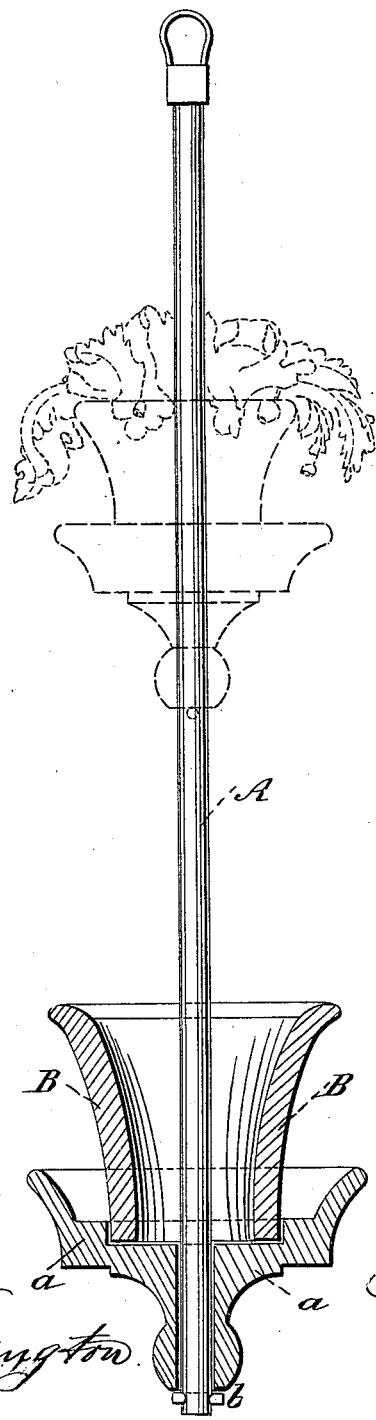

UNITED STATES PATENT OFFICE.

THOMAS PRINCE, OF ROXBURY, MASSACHUSETTS.

IMPROVEMENT IN SUPPORTS FOR FLOWER-POTS.

Specification forming part of Letters Patent No. 52,200, dated January 23, 1866.

*To all whom it may concern:*

Be it known that I, THOMAS PRINCE, of Roxbury, in the county of Norfolk and State of Massachusetts, have invented a new and Improved Stand or Support for Flower-Pots; and I do hereby declare that the following is a full, clear, and exact description thereof, which will enable others skilled in the art to make and use the same, reference being had to the accompanying drawing, forming part of this specification.

My invention consists in a novel manner of arranging and supporting one or more flower-pots, intended especially for holding hanging or drooping flowers.

My invention is illustrated in the accompanying drawing, which shows one flower-pot in section, attached to a rod running through its center, according to my invention, and another in red, located higher up on the rod.

A represents a rod, which, in this instance, is provided with a ring, $a$, at its top, by which to hang it up, the said rod being long enough to receive or hold a number of pots containing flowers.

B is the flower-pot, and $a$ its saucer, through whose center passes the rod A; and this pot and saucer are held at the desired point by a peg, $b$, running through the rod on which the saucer rests. It is designed to have several of these pots upon one rod, and to plant in them hanging or drooping flowers, which will fall down over the sides of the pots and present a beautiful appearance.

The rod A, in the present instance, as before stated, is intended to be hung up; but it is evident, if it be desired not to so have it, the lower end could be easily set in a proper pedestal, which would provide a tasty flower-stand; or, indeed, the end of the said rod could be sharpened and driven into the ground, when a tasteful ornament for a lawn or flower-garden would be obtained.

The rod A is represented as being made of wood; but it is evident that other materials could be used—as, for instance, for a hanging device wire could be used, and the pots and saucers supported at the proper distances apart by knots or twists in the wire. This would probably be the cheapest way of constructing it; but in cases where it is to be used as a stand the rod must, of course, be sufficiently stiff to support the pots.

What I claim as new, and desire to secure by Letters Patent, is—

Arranging a number of flower-pots, B, upon a rod, A, passing through them, substantially as and for the purpose specified.

THOMAS PRINCE.

Witnesses:
    JAMES SHORT,
    JOSEPH HENDRY.